United States Patent [11] 3,607,652

[72] Inventor Kiyomoto Ueda
 Tokyo, Japan
[21] Appl. No. 827,932
[22] Filed May 26, 1969
[45] Patented Sept. 21, 1971
[73] Assignee Eisai Kabushiki Kaisha
 Tokyo, Japan
[32] Priority May 25, 1968
[33] Japan
[31] 43/35311

[54] PROCESS FOR THE PRODUCTION OF D-ARABITOL
 2 Claims, No Drawings
[52] U.S. Cl. ......................................................... 195/37
[51] Int. Cl. ....................................................... C12d 13/00
[50] Field of Search ........................................... 195/35, 37, 43

[56] References Cited
UNITED STATES PATENTS
2,934,474 4/1960 Lavin et al. ................... 195/37
OTHER REFERENCES
 Onishi et al., " Fermentative Production of Glycerol D-arabitol, and Erythritol Chem. Abs., Vol. 59, 3288f.

Primary Examiner—A. Louis Monacell
Assistant Examiner—Gary M. Nath
Attorney—Wenderoth, Lind & Ponack ABSTRACT: A process for the fermentative production of D-arabitol by cultivating under aerobical condition a micro-organism Pichia ohmeri No. 230 (ATCC Deposit No. 20209) in a nutrient medium containing fermentable saccharides such as glucose, sucrose, mannose, fructose and the like as carbon source, and recovering D-arabitol accumulated in the cultivated liquor.
 D-arabitol is thus obtained at a high yield without substantial formation of other polyhydric alcohols having similar properties.

PROCESS FOR THE PRODUCTION OF D-ARABITOL

This invention relates to the production of D-arabitol by fermentation. More particularly, the present invention relates to a process for the production of D-arabitol by aerobical cultivation of a micro-organism *Pichia ohmeri* No. 230 (ATCC Deposit No. 20209 ), in a nutrient medium containing fermentable saccharides.

D-arabitol thus obtained serves as important starting material for the production of useful D-xylose through D-xylulose.

There are many reports with respect to the production of various polyhydric alcohols from saccharides, for example, D-glucose by the aid of yeasts. Thus D-arabitol, for example, is biologically produced by cultivating *Pichia miso*, which is a micro-organism belonging to *Pichia* species, in a nutrient medium containing D-glucose. (Comp. Japanese Patent Publication No. 3545/62.)

The process, however, has a drawback of a poor yield of D-arabitol, because there occurs a simultaneous formation of considerable amounts of the polyhydric alcohols such as glycerol, erythritol and the like other than D-arabitol. Troublesome treatments are required for the isolation and subsequent purification of the contemplated D-arabitol from the coexistent by-products having similar properties.

It was demonstrated that a number of yeasts belonging to genus Debaryomyces, Hansenula and Saccharomyces are effective for the production of D-arabitol from saccharides. These methods have also a drawback like that of the case in which *Pichia miso* is used.

It has been found that D-arabitol is produced at a high yield without substantial formation of other polyhydric alcohols, when a micro-organism *Pichia ohmeri* , e.g., *P.Ohmeri* No. 230 (Deposit No. 158 of the Fermentation Research Institute, Agency of Industrial Science and Technology, Japan, and ATCC Deposit No. 20209 ), is aerobically cultivated in a nutrient medium containing usual fermentable saccharides such as glucose, sucrose, mannose, fructose and the like.

The taxonomical studies of the particular micro-organism isolated from soil of Toshima-ward of Tokyo Japan, was carried out in accordance with the method described by J. Lodder et al. in the book "The Yeasts a Taxonomic Study" published by Interscience Publishers, New York, 1952.

The micro-organism thus obtained exhibited the following bacteriological properties:

a. YM liquid medium: After 3 days at 25° C., the cells were oval, long-oval or cylindrical forms with the dimension of $(1.5\ 5) \times (1.5\ 12)\mu$. Sediment and pellicle were formed.

b. YM agar: After 2 weeks, the slant culture appeared grayish yellow. At the first stage of the growth, its surface was smooth, which later changed to rugose. The circumference was ciliary.

c. Pseudomycelium: Cultivation on potato-dextrose medium according to Dalmau-agar method produced pseudomycelia.

d. Spore: No spore formation took place on the conventional spore-forming medium when the micro-organism alone was inoculated. (Since *Pichia ohmeri* is one of heterothallic species, the same unless crosses with other species does not form ascospores.)

e. Fermentation of saccharides:

i. glucose: positive
    ii. galactose: positive (slow)
    iii. sucrose: positive
    iv. maltose: negative
    v. lactose: negative
    vi. raffinose: positive f. Assimilation of carbon sources:

Glucose, galactose, sucrose, maltose, sorbose, cellobiose, trehalose, raffinose, ethanol, glycerol, adonitol, mannitol, sorbitol, αmetyl glucoside, glucoside, salycin were assimilated, while lactose, melibiose, melecitose, xylose, arabinose, erythritol, dulcitol, gluconic acid, inositol and starch were not assimilated.

g. Nitrates: Not as ilated.

h. Vitamin requirement: Biotin was required.

i. Urease activity: No activity in Christensens medium.

j. No gelatin liquefaction occurred.

k. Source of the isolation: Soil taken at Toshima-ward of Tokyo Japan.

In view of the above bacteriological behaviors, the strain of the micro-organism was identified a species of *Pichia ohmeri* and was named *Pichia ohmeri* No. 230.

The performance of the process of the present invention is based on the advantageous utilization of the above specified micro-organism *Pichia ohmeri* No. 230. According to the process of the present invention, D-arabitol is obtained at a high yield by aerobical cultivation of the said micro-organism in a nutrient medium which contains as the essential carbon source a fermentable saccharide to result in an accumulation of D-arabitol, and recovering the latter in accordance with a conventional procedure.

As the carbon sources used in the nutrient medium for carrying out the fermentation of the present invention, there may be mentioned any saccharides so far as they are utilizable by the said *Pichia ohmeri*. It was found that glucose, sucrose, mannose, maltose, fructose and the like are particularly preferable.

Natural and artificial nutrient media may equally be employed, which are prepared by admixing a selected carbon source with an organic or inorganic nitrogeous source such as ammonium chloride, sulfate, nitrate, acetate, urea and the like, and a small quantity of nutriments such as corn steep liquor, yeast extract, casamino acid, peptone and vitamins, and also an inorganic substances such as $KH_2PO_4$, $MgSO_4 \cdot 7H_2O$ and the like.

Although control of the pH value of the nutrient medium during the cultivation is not necessary, it is desirable to maintain the pH value of 4~7 in order to ensure an increased yield of D-arabitol. Control of the pH value can advantageously be effected with addition, for example, of calcium carbonate.

When the fermentation is carried out according to the present invention with a nutrient medium which contains a saccharide at a concentration of about 10 percent by weight, then D-arabitol is obtained at the yield of about 40 percent calculated on the total weight of said saccharide.

On the other hand, when the fermentation is carried out with a nutrient medium which contains a saccharide at a lower concentration such as about 3~5 percent by weight and the deficiency of the saccharide is compensated by periodical feedings of the saccharide so that the concentration of the saccharide in the nutrient medium is maintained to about 3~5 percent throughout the process, there is obtained an increased yield such as 50 percent yield($8 \sim 9 g/dl$)of the D-arabitol based on the total weight of the saccharide.

Furthermore, an accelerated multiplication of the cells and an increased yield of D-arabitol are obtained when oxygen absorption coefficient (Kd) in the aerobical cultivation medium is maintained within the range of $7.7 \times 10^{16}$ to $4.15 \times 10^{16}$ measured by means of the sulfite oxidation method. While, if the (Kd) value lower than $4 \times 10^{16}$ is employed, the saccharide consumption diminishes and a fragrant ester odor is smelled resulting in a considerable lowering of the yield of D-arabitol.

After completion of the fermentation, the D-arabitol is isolated from the cultivated liquor in accordance with the usual procedures, that is, the steps of removing the grown cells, treating the remaining liquor with active carbon, concentrating the liquor and recrystallizing the residue from hot ethanol and the like.

It is worthy of notice that the isolation of D-arabitol from the liquor of fermentation according to the present invention can readily be effected, as the liquor contains the contemplated D-arabitol at a high concentration without accompanying other polyhydric alcohols having similar properties.

The following examples are given to illustrate the invention. In the examples all per cents are by weight.